(12) United States Patent
Koch et al.

(10) Patent No.: US 8,202,950 B2
(45) Date of Patent: *Jun. 19, 2012

(54) SLURRY PHASE POLYMERISATION PROCESS

(75) Inventors: Benoit Koch, Hannut (BE); Daniel Marissal, Sausset les Pins (FR); Marc Parisel, Vilvoorde (BE); Brent R. Walworth, Sint-Niklaas (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 132 days.

This patent is subject to a terminal disclaimer.

(21) Appl. No.: 12/733,379

(22) PCT Filed: Aug. 29, 2008

(86) PCT No.: PCT/EP2008/061372
§ 371 (c)(1),
(2), (4) Date: Jul. 9, 2010

(87) PCT Pub. No.: WO2009/030647
PCT Pub. Date: Mar. 12, 2009

(65) Prior Publication Data
US 2010/0273960 A1 Oct. 28, 2010

(30) Foreign Application Priority Data
Sep. 3, 2007 (EP) .................... 07253486

(51) Int. Cl.
C08F 2/00 (2006.01)
C08F 4/44 (2006.01)
C08F 4/72 (2006.01)
B01J 19/00 (2006.01)
B01J 19/18 (2006.01)
F01N 3/20 (2006.01)

(52) U.S. Cl. ............ 526/64; 526/65; 526/160; 526/170; 422/131; 422/132; 422/105

(58) Field of Classification Search .................. 526/64, 526/65, 160, 170; 422/131, 132, 105
See application file for complete search history.

(56) References Cited

U.S. PATENT DOCUMENTS
2004/0198911 A1 10/2004 Van Dun et al.
2005/0272891 A1* 12/2005 Fouarge et al. ............... 526/943

FOREIGN PATENT DOCUMENTS
EP 0 649 860 A1 4/1995
WO WO 92/12181 7/1992

OTHER PUBLICATIONS
Form PCT/IB/326, Notification Concerning Transmittal of International Preliminary Report on Patentability, mailed Mar. 18, 2010; PCT International Application No. PCT/EP2008/061372; International Filing Date Aug. 29, 2008 (10 pgs).

* cited by examiner

*Primary Examiner* — William Cheung
(74) *Attorney, Agent, or Firm* — Nixon & Vanderhye

(57) ABSTRACT

Process for producing a multimodal polyethylene in at least two loop reactors connected in series. In the process 20-80 wt % of a high molecular weight (HMW) polymer is made in suspension in a first reactor and 20-80 wt % of a low molecular weight (LMW) polymer is made in suspension in a second reactor, one polymer being made in the presence of the other in either order. The ratio of the average activity in the LMW reactor to the average activity in the HMW reactor is from 0.25 and 1.5, where average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)], residence time being defined as the mass of the polymer in the reactor (kg)/the output rate of polymer from the reactor (kg/hr), and the volumes of the two reactors differ by less than 10%.

26 Claims, No Drawings

SLURRY PHASE POLYMERISATION PROCESS

This application is the U.S. national phase of International Application No. PCT/EP2008/061372 filed 29 Aug. 2008 which designated the U.S. and claims priority to European Application No. 07253486.0 filed 3 Sep. 2007, the entire contents of each of which are hereby incorporated by reference.

The present invention is concerned with olefin polymerisation in slurry phase reactors, and more particularly with polymerisation in two or more reactors arranged in series.

Slurry phase polymerisation of olefins is well known wherein an olefin monomer and optionally olefin comonomer are polymerised in the presence of a catalyst in a diluent in which the solid polymer product is suspended and transported.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts.

Many multiple reactor systems employ loop reactors, which are of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of each loop reactor of a multiple reactor system can vary but is typically in the range 10-200 m$^3$, more typically 50-120 m$^3$. The loop reactors employed in the present invention are of this generic type.

Typically, in the slurry polymerisation process of polyethylene for example, the slurry in the reactor will comprise the particulate polymer, the hydrocarbon diluent(s), (co) monomer(s), catalyst, chain terminators such as hydrogen and other reactor additives In particular the slurry will comprise 20-75, preferably 30-70 weight percent (based on the total weight of the slurry) of particulate polymer and 80-25, preferably 70-30 weight percent (based on the total weight of the slurry) of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

The slurry is pumped around the relatively smooth path endless loop reaction system at fluid velocities sufficient to maintain the polymer in suspension in the slurry and to maintain acceptable cross-sectional concentration and solids loading gradients. Slurry is withdrawn from the polymerisation reactor containing the polymer together with the reagents and inert hydrocarbons, all of which mainly comprise inert diluent and unreacted monomer. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

In multiple reactor polymerisations, the composition of the slurry withdrawn from the final reactor depends on many factors apart from the composition of the product actually polymerised in the final reactor: it also depends on the desired final product, and the reaction conditions and relative proportions of products in any upstream reactors. The reaction conditions required in the final reactor are also affected by the reaction conditions in upstream reactors, particularly the impact of catalyst productivity in upstream reactors on the average activity potential under downstream reaction conditions. Thus the control of the slurry composition withdrawn from the final reactor and also the process conditions associated therewith is more complex than in the case of a single reactor.

One issue which can affect all of the above factors is the relative size of the two loop reactors. In a multiple reactor polymerisation, the second and any subsequent reactors need to be large enough to handle not only the polymer produced in that reactor, but also the polymer transferred from the previous reactor or reactors. Thus it is logically desirable to make the second and subsequent loop reactors larger than the first. However, where a reactor system is designed to operate different catalyst types (eg Ziegler-Natta, chromium and/or metallocene), or a catalyst system where the average activity or production ratio required varies significantly between reactors under different operating regimes, the ideal ratio of sizes for the reactors in each case is likely to be different, making it difficult to select an ideal size profile. The ratio of activity in each reactor under constant reaction conditions also varies significantly between Ziegler-Natta, chromium, metallocene and/or late transition metal catalyst systems. Finally, the cooling requirements of the reactors may be different—for example, when using chromium catalysts in both reactors the cooling requirement is largest in the first reactor, whereas in a standard bimodal arrangement where the second reactor contains all the polymer made in the first reactor, the cooling requirement is largest in the second reactor.

We have found that maximum flexibility can be achieved for systems comprising at least two reactors in series if the two reactors are approximately the same size.

Thus in its first aspect, the present invention provides a process for producing a multimodal polyethylene in at least two loop reactors connected in series, in which 20-80 wt % of a high molecular weight (BMW) polymer is made in suspension in one reactor and 20-80 wt % of a low molecular weight (LMW) polymer is made in suspension in another reactor, one polymer being made in the presence of the other in either order, wherein the ratio of the average activity in the LMW reactor to the average activity in the HMW reactor is from 0.25 and 1.5, where average activity in each reactor is defined as the amount of polyethylene produced in the reactor (kgPE)/ [ethylene concentration in the reactor (mol %)×residence time in the reactor (hours)×weight of catalyst in the reactor (g)], residence time being defined as the mass of the polymer in the reactor (kg)/the production rate of polymer (kg/hr), and the volumes of the two reactors differ by less than 10%.

Generally it is preferred that all of the volume, length and diameter of the reactors employed each independently differ by less than 10%. In such a case it is also preferred that the ratio of length to diameter of the two reactors, L/D, differs by less than 10% as well. However in certain embodiments of the invention, it is more appropriate for the volume, length and diameter of the reactors employed to vary by more than 10%. Usually each of the reactors has an internal volume greater than 10 m$^3$, more commonly greater than 25 m$^3$ and in particular greater than 50 m$^3$. Typical ranges are 75-200 m$^3$ and more particularly 100-175 m$^3$.

We have found that by employing reactors of approximately the same size (meaning that their volumes differ by less than 10%), it is possible to operate a relatively wide range of polymerisation processes employing different catalysts and polymerisation conditions in order to obtain multimodal polymers having the desired block ratio. Furthermore, utilising two reactors of the same size also reduces the costs of construction.

It is preferred that both reactors are "liquid full", that is to say that there is substantially no gas- or vapour-containing headspace in the reactor.

Typical pressures employed in the loop reactor are between 0.1-10 MPa g, preferably between 3 to 5 MPa g.

Preferably the multimodal polyethylene has a shear ratio of at least 15, generally between 15 and 50, and preferably between 21 and 35. By "shear ratio" is meant the ratio of the high load melt index HLMI of the polyethylene to the $MI_5$ of the polyethylene. The HLMI and $MI_5$ are measured according to ISO Standard 1133 at a temperature of 190° C. using loads of 21.6 kg and 5 kg respectively. $MI_2$ is similarly measured but using a load of 2.16 kg.

The HLMI of the multimodal polyethylene exiting the second reactor is preferably between 1 and 100 g/10 min, and more preferably between 1 and 40 g/10 min.

The process according to the invention is suitable for use with all olefin polymerisation catalyst systems, particularly those chosen from the Ziegler-type catalysts, chromium catalysts or metallocene catalysts. Preferred Ziegler-type catalysts are those derived from titanium, zirconium or vanadium; preferred chromium catalysts are thermally activated silica or inorganic supported chromium oxide catalysts, and preferred metallocene-type catalysts are cyclopentadienyl derivatives of a transition metal, in particular of titanium or zirconium.

The catalyst employed for the polymerisation may be a Ziegler-Natta catalyst. In this case, it is preferred that the ratio of LMW to HMW polymer is from 40:60 to 60:40. It is also preferred that the space time yield (defined as production of polymer in kg/h per cubic metre of reactor) is at least 150 kg/m$^3$/h, preferably at least 200 kg/m$^3$/h, most preferably at least 250 kg/m$^3$/h.

In one embodiment of the invention, the HMW polymer is made in suspension in the first reactor and the LMW polymer is made in suspension in the second reactor in the presence of the HMW polymer. Any catalyst may be used. Preferably the amounts of each polymer are 30-70 wt % and 70-30 wt % respectively. The following requirements apply to this embodiment only. In this embodiment, it is preferred that the ratio of length to diameter of the first HMW reactor, L/D(1), is greater than that of the second LMW reactor, L/D(2). More preferably L/D(1) is at least 20% greater than L/D(2), and most preferably at least 30% greater. Typically, the ratio of L/D(1) to L/D(2) is greater than 1.5, most preferably greater than 2. An increased L/D provides a greater surface area per unit volume, which in turn provides a greater cooling capacity, as the ability to cool a reactor depends on the surface area available to which cooling can be applied. Generally it is preferred that the ratio of length to diameter (L/D) of the first reactor is greater than 500, preferably between 750 and 3000, and most preferably greater than 800.

In multiple reactor polymerisations, the composition of the slurry withdrawn from the final reactor depends on many factors apart from the composition of the product actually polymerised in the final reactor: it also depends on the desired final product, and the reaction conditions and relative proportions of products in any upstream reactors. The reaction conditions required in the final reactor are also affected by the reaction conditions in upstream reactors, particularly the impact of catalyst productivity in upstream reactors on the average activity potential under downstream reaction conditions. It is generally desirable that the majority of the liquid components withdrawn with the polymer from the final reactor are separated in a flash tank at a temperature and pressure such that they can be recondensed just by cooling, without recompression. The remaining liquid components not removed by this process are separated in a second flash tank operating at a lower pressure, and these need to be recompressed in order to be recycled. The advantage of this process, which is referred to hereinafter as a "medium pressure flash" process, is that only a small proportion of the vaporised liquid components need to be recompressed in order to be recondensed. We have found that by careful control of the reaction conditions in this HMW-LMW embodiment of the present invention it is possible to ensure that a "medium pressure flash" process is able to be operated without the need for recompression of the liquid vaporised in the first flash tank.

This embodiment of the present invention is particularly applicable when the polymerisation catalyst is a Ziegler-Natta catalyst, especially if the overall productivity of the process is at least 10 kg polyethylene/g catalyst, preferably greater than 15 kg polyethylene/g catalyst, most preferably greater than 20 kg polyethylene/g catalyst. If the polymerisation catalyst is a bis-Cp metallocene catalyst, most preferably a bis-tetrahydroindenyl (THI) compound, the overall productivity of the process in this case is preferably at least 3 kg polyethylene/g catalyst, preferably greater than 6 kg polyethylene/g catalyst, most preferably greater than 15 kg polyethylene/g catalyst. If the polymerisation catalyst is a mono-Cp metallocene catalyst, most preferably (t-butylamido) (tetramethyl-$\eta^5$-cyclopentadienyl)dimethyl silanetitanium-$\eta^4$-1.3-pentadiene, the overall productivity of the process in this case is preferably at least 3 kg polyethylene/g catalyst, preferably greater than 6 kg polyethylene/g catalyst, most preferably greater than 15 kg polyethylene/g catalyst.

In order to achieve the above ratio of average activities, it is preferred that the ratio of ethylene concentration (in mol %, based on the total liquids in the reactor.) in the second reactor to that in the first reactor is 5 or less. Preferably the ratio of ethylene concentration in the second reactor to that in the first reactor is 3 or less, and more preferably 2.5 or less. Most preferably both ethylene concentration ratio and average activity ratio requirements are satisfied together.

In this HMW-LMW embodiment it is preferred that the actual concentration of ethylene in the second reactor is less than 8 mol %, based on the total liquids in the reactor. However in order to ensure a satisfactory level of productivity, it is also preferred that the ethylene concentration is greater than 1.5 mol %, preferably greater than 2 mol %. The concentration of hydrogen in the second reactor is preferably less than 5 mol %, more preferably less than 3 mol %. The ratio of hydrogen to ethylene is preferably 0-0.5 mol/mol.

In the HMW-LMW embodiment of the invention, maintaining the temperature of the first reactor between 60 and 80° C., preferably less than 75° C., can assist in balancing the activities between the reactors and the respective cooling capacities. It is also preferred that the ratio of solids concentration in the first reactor to that in the second reactor is maintained at less than 1.0, preferably between 0.6 and 0.8, as this also assists in maintaining the balance of average activity between the two reactors within the desired range.

Generally in the HMW-LMW embodiment of the invention, the solids concentration in the final LMW reactor is at least 35wt %, most preferably between 45 wt % and 60 wt % and the solids concentration in the HMW reactor is between 20 wt % and 50 wt %, more preferably between 25 wt % and 35 wt %. The solids concentration is the weight of polymer relative to the total weight of the slurry. In this case it is preferred to concentrate the solids transferred from the first reactor to the second reactor using a settling zone and/or hydrocyclone. A comonomer-free diluent stream may be introduced upstream of the hydrocyclone to reduce the proportion of comonomer transferred to the downstream reactor, thus increasing the density of the polymer produced in the LMW reactor.

In a preferred version of this HMW-LMW embodiment of the invention, a stream or slurry containing the multimodal polyethylene is transferred from the second of the two reactors to a flash tank operating at a pressure P and temperature such that at least 50 mol %, preferably that at least 80 mol %, more preferably 90 mol %, most preferably 95 mol % of the non-polymer or liquid component of the stream or slurry is withdrawn from the flash tank as a vapour. In this embodiment it is preferred that the concentration in the stream or slurry entering the flash tank of components having a molecular weight below 50 g/mol, $C_{lights}$ (mol %), satisfies the equation: $C_{lights} < 7 + 0.07(40-T_c) + 4.4(P_c - 0.8) - 7(C_{H2}/C_{Et})$ where $T_c$, and $P_c$ are respectively the temperature (in ° C.) and pressure (MPa g) at the location where the vapour withdrawn from the flash tank is condensed, and $C_{H2}$ and $C_{Et}$ are the molar concentrations in the flash tank of hydrogen and ethylene respectively. The invention assists in achieving this by minimising the concentration of $C_{lights}$ in the second reactor. It will be understood that "first" and "second" reactors refers to the order of polymerisation, regardless of which polymer is made in which reactor.

Preferably the concentration of components having a molecular weight below 50 in the stream or slurry entering the flash tank is controlled by controlling that concentration in the second reactor. Accordingly it is preferred that the concentration in the second reactor of components having a molecular weight below 50 also satisfies the equation $C_{lights} < 7 + 0.07(40 - T_c) + 4.4(P_c - 0.8) - 7(C_{H2}/C_{Et})$ where $C_{lights}$, $C_{H2}$, and $C_{Et}$ in this case are the concentrations of components having a molecular weight below 50, hydrogen and ethylene respectively in the second reactor and $P_c$ and $T_c$ are as previously defined. More preferably the concentration of components having a molecular weight below 50 in the second reactor is the same as the concentration of components having a molecular weight below 50 entering the flash tank.

It is generally preferred that the concentration of components having a molecular weight below 50 satisfies the equation $C_{lights} < 6.5 + 0.07(40 - T_c) + 4.4(P_c - 0.8) - 7(C_{H2}/C_{Et})$ where $C_{lights}$, $C_{H2}$, $C_{Et}$, $P_c$ and $T_c$, are as defined previously and refer either to the second reactor or the flash tank depending on the particular embodiment of the invention.

In this embodiment of the invention ("HMW-LMW"), it is preferably ensured that the concentration of components having a molecular weight below 50 in the second reactor satisfies the equation $C_{lights} < 7 + 0.07(40 - T_c) + 4.4(P_c - 0.8) - 7(C_{H2}/C_{Et})$ by ensuring the ratio of the average activity in the second LMW reactor to the average activity in the first HMW reactor is from 0.25 and 1.5. Average activity is typically higher in the first reactor (where a copolymer is usually made to obtain the HMW product) than in the second reactor (where a homopolymer is usually made to obtain the LMW product), and we have found that as a consequence the ratio of average activities between the reactors has to be controlled within these ranges in order to control the concentration of light components in the second reactor. The average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)]. If no additional catalyst is added to the second reactor, when calculating the ratio of average activities the flow rate of catalyst in the two reactors is considered to be the same. If additional catalyst is added to the second reactor, the flow rate into the second reactor is considered to be the sum of the flowrate of catalyst from the first reactor plus the flowrate of additional fresh catalyst added directly into the second reactor. Alternatively, activity in each reactor may be calculated based on catalyst residues in the polymer produced in each reactor, as is well known, and the activity ratio calculated from this.

The residence time is defined as the mass of the polymer in the reactor (kg)/the output rate of polymer from the reactor (kg/hr). In a case where polymer is recycled back into the reactor, for example when a hydrocyclone is employed downstream of the reactor, the output rate of polymer is the net output rate (ie polymer withdrawn less polymer recycled).

By maintaining the preferred ratio of average activity and ethylene concentration ratio between the two reactors in the HMW-LMW embodiment, it is possible to achieve high overall space time yields (defined as production of polymer in kg/h per unit volume of reactor) and activities whilst still observing the $C_{lights}$ requirements of the invention in the flash tank. The average space time yield in all reactors combined may be maintained at greater than 100 kg/m³/h, more preferably greater than 150 kg/m³/h, and most preferably greater than 200 kg/m³/h.

Alternatively, the LMW polymer is made in suspension in the first reactor and the HMW polymer is made in suspension in the second reactor in the presence of the LMW polymer. The following requirements apply to this embodiment only.

In this embodiment, it is preferred that the ratio of length to diameter of the first HMW reactor, L/D(1), is greater than that of the second LMW reactor, L/D(2).

This embodiment of the present invention is particularly applicable when the polymerisation catalyst is a Ziegler-Natta catalyst, especially if the overall productivity of the process is at least 10 kg polyethylene/g catalyst, preferably greater than 15 kg polyethylene/g catalyst, most preferably greater than 20 kg polyethylene/g catalyst. If the polymerisation catalyst is a bis-Cp metallocene catalyst, most preferably a bis-tetrahydroindenyl (THI) compound, the ratio of average activity in the second HMW reactor to average activity in the first LMW reactor is preferably between 1.5 and 0.25, and the overall productivity of the process in this case is preferably at least 3 kg polyethylene/g catalyst, preferably greater than 6 kg polyethylene/g catalyst, most preferably greater than 15 kg polyethylene/g catalyst. If the polymerisation catalyst is a mono-Cp metallocene catalyst, most preferably (t-butylamido) (tetramethy-$\eta^5$-cyclopentadienyl)dimethyl silanetitanium-$\eta^4$-1.3-Pentadiene, the Ratio of Average Activity in the Second Hmw Reactor to average activity in the first LMW reactor is preferably between 1.5 and 0.25, and the overall productivity of the process in this case is preferably at least 3 kg polyethylene/g catalyst, preferably greater than 6 kg polyethylene/g catalyst, most preferably greater than 15 kg polyethylene/g catalyst.

In order to achieve the above ratio of average activity, it is preferred that the ratio of ethylene concentration (in mol %) in the second reactor to that in the first reactor is 5 or less. Most preferably both ethylene concentration ratio and ratio of average activity requirements are satisfied together. Preferably the ratio of ethylene concentration in the second reactor to that in the first reactor is 3 or less, and more preferably 2 or less.

In this LMW-HMW embodiment it is preferred that the actual concentration of ethylene in the second reactor is less than 8 mol %, based on the total liquids in the reactor. However in order to ensure a satisfactory level of productivity, it is also preferred that it is greater than 2 mol %. The ethylene concentration is preferably between 2 and 5 mol %. The concentration of hydrogen in the second reactor is preferably less than 5 mol %, more preferably less than 3 mol %.

It is preferred to balance the activities between the reactors and the respective cooling capacities by maintaining the temperature of the first reactor between 70 and 110° C., preferably between 80 and 100° C. It is also preferred that the ratio of solids concentration in the first reactor to that in the second reactor is maintained at between 0.8 and 1.2, preferably between 0.9 and 1.0, as this also assists in maintaining the balance of average activity between the two reactors within the desired range.

Generally in the LMW-HMW embodiment of the invention, the solids concentration in each reactor is at least 35 wt %, most preferably between 45 wt % and 55 wt %. The solids concentration is the weight of polymer relative to the total weight of the slurry. In this case it is preferred to concentrate the solids transferred from the first reactor to the second reactor using a settling zone and/or hydrocyclone. A hydrogen-free diluent stream may be introduced upstream of the hydrocyclone to reduce the proportion of hydrogen transferred to the downstream reactor. It is most preferred to flash or fractionate the diluent transferred to the second (HMW) reactor hydrocyclone in order to minimize the hydrogen transferred to the downstream reactor.

In a preferred version of this embodiment of the invention ("LMW-HMW"), a stream or slurry containing the multimodal polyethylene is transferred from the second of the two reactors to a flash tank operating at a pressure P and temperature such that at least 50 mol %, preferably that at least 80 mol %, more preferably 90 mol %, most preferably 95 mol % of the non-polymer or liquid component of the stream or slurry is withdrawn from the flash tank as a vapour. It is preferably ensured that the concentration in the slurry entering the flash tank of components having a molecular weight below 50 g/mol, $C_{lights}$ (mol %), satisfies the equation: $C_{lights} < 7 + 0.07(40 - T_c) + 4.4(P_c - 0.8) - 7(C_{H2}/C_{Et})$ where $T_c$ and $P_c$ are respectively the temperature (in ° C.) and pressure (MPa g) at the location where the vapour withdrawn from the flash tank is condensed, and $C_{H2}$ and $C_{Et}$ are the molar concentrations in the flash tank of hydrogen and ethylene respectively, by ensuring the ratio of average activity in the second HMW reactor to average activity in the first LMW reactor is from 1.5 to 0.25. The average activity in each reactor is as defined above.

For both of the above embodiments of the invention (HMW-LMW and LMW-HMW), additives to enhance average activity may be added, preferably to the LMW reactor. Equally by-product suppressors may be added, preferably to the LMW reactor. Additionally or alternatively, further catalyst may also be added to the second reactor in order to control the average activity balance. When operating HMW-LMW configuration it is preferred to avoid the use of an activity enhancer in the HMW reactor and in LMW-HMW configuration it can generally be avoided, however can be used to minimise the concentration of monomers required in the HMW reactor. This reduces the downstream degassing energy requirements.

In all embodiments of the invention, one benefit of the invention is that optimisation of reactor average activity balance, space time yields and cooling requirements, whilst at the same time minimising the $C_{lights}$ concentration in the flash tank so as to avoid the need to recompress, leads to improved efficiency. This invention can enable monomer efficiencies of less than 1.015, generally less than 1.01 and preferably less then 1.006 to be achieved even when employing a space time yield of at least 100 kg/m³/h, more preferably at least 150 kg/m³/h, most preferably at least 200 kg/m³/h in each reactor.

By "monomer efficiency" is meant the weight ratio of ethylene+comonomer consumed to polymer produced.

In the case where the catalyst used for the polymerisation reaction is a Ziegler-Natta catalyst, it is preferred that a single activity enhancer and by-product suppressor is used in the LMW reactor. An example is a halogenated hydrocarbon, and more particularly a chloromethane of the formula $CH_xCl_{4-x}$ where x is an integer from 1 to 3. The most preferred chloromethane is chloroform, $CHCl_3$. The amount of halogenated hydrocarbon added is based on the amount of Ziegler-Natta catalyst, and is preferably such that the molar ratio of the halogenated hydrocarbon added to the reactor to titanium added to the reactor is greater than 0.1, preferably between 0.2 and 1. The use of a halogenated hydrocarbon is particularly desirable when used in conjunction with catalyst systems where it both enhances activity and suppresses the ethane formation, such as Ziegler-Natta catalysts. It is also useful in a reactor producing low molecular weight polymer since it has the combined effect of enhancing activity and suppressing ethane formation. Ethane formation adds to the concentration of light reagents in the reactor, thereby making it more difficult to maintain the concentration of $C_{lights}$ in the feed to the flash tank below the level requried by the invention. Ethane formation can be particularly significant when making low molecular weight polymers, particularly if hydrogen is present. When making low molecular weight polymer in the second reactor it is also particularly desirable to boost the activity of the catalyst since the age of the catalyst and the high hydrogen concentration both contribute to a reduction in polymerisation activity. Halogenated hydrocarbons such as chloroform can therefore provides a double benefit, by boosting activity boost also minimising the concentration of $C_{lights}$ in the second reactor.

The process according to the invention applies to the preparation of compositions containing ethylene homopolymers and copolymers. Ethylene copolymers typically comprise one or more alpha-olefins in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

In one embodiment of the invention, the polymer is a polyethylene resin having a density of greater than 940 kg/m³ and an HLMI of from 1 to 100 g/10 min, and comprising from 35 to 60 wt % of a first polyethylene fraction of high molecular weight and from 40 to 65 wt % of a second polyethylene fraction of low molecular weight, the first polyethylene fraction comprising a linear low density polyethylene having a density of up to 935 kg/m³ and an HLMI of less than 1 g/10 min, and the second polyethylene fraction comprising a high density polyethylene having a density of at least 960 kg/m³, preferably at least 965 kg/m³, and an $MI_2$ of greater than 100 g/10 min, and the polyethylene resin.

Typical diluents for the suspensions in each reactor include hydrocarbons having 2 to 12, preferably 3 to 8, carbon atoms per molecule, for example linear alkanes such as propane, n-butane, n-hexane and n-heptane, or branched alkanes such as isobutane, isopentane, isooctane and 2,2-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the diluent.

The operating conditions can also be such that the monomers act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is preferably adjacent to the downstream end of a horizontal section of the loop. The operation of large diameter reactors with high solids concentrations in the slurry minimises the quantity of the principal diluent withdrawn from the polymerisation loop. Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided. Increasing the concentration of easily condensable components, for example through addition of fresh or recycle diluent, upstream of the hydrocyclone is a further means of enhancing the operating window of the final reactor and reducing the concentration of monomer depressurised to the medium pressure flash tank.

Where the final reactor of the multiple reactor system is a loop reactor, the withdrawn, and preferably concentrated, polymer slurry is depressurised, and optionally heated, prior to introduction into a primary flash vessel. The stream is preferably heated after depressurisation. As a consequence of the invention, the diluent and any monomer vapours recovered in the primary flash vessel can be condensed without recompression. They are typically then recycled to the polymerization process. Typically the pressure in the primary flash vessel is 0.5-2.5 MPa g, preferably 0.5-1.5 MPa g. The solids recovered from the primary flash vessel are usually passed to a secondary flash vessel to remove residual volatiles.

Ziegler, metallocene and chromium catalysts are most preferred for use in the present invention.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionising agent as described, for example, in EP 500944A (Mitsui Toatsu Chemicals).

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a volume porosity of greater than 2 cc/g preferably from 2 to 3 cc/g. Chromium-based catalysts may be used in conjunction with activators such organometallic compounds of aluminium or of boron. Preferred are organoboron compounds such as trialkylborons in which the alkyl chains comprise up to 20 carbon atoms. Triethylboron is particularly preferred.

Ziegler-type catalysts are most preferred. Among these, particular examples include at least one transition metal chosen from groups IIIB, IVB, VB and VIB, magnesium and at least one halogen. Good results are obtained with those comprising:

from 10 to 30% by weight of transition metal, preferably from 15 to 20% by weight, from 20 to 60% by weight of halogen, preferably from 30 to 50% by weight from 0.5 to 20% by weight of magnesium, usually from 1 to 10% by weight, from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine. Most preferred catalysts have the following composition:

Transition metal from 8 to 20% by weight
Magnesium content from 3 to 15% by weight
Chlorine content from 40 to 70% by weight
Aluminum content less than 5% by weight
Residual organic content less than 40% by weight Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

If the catalyst employed is a metallocene catalyst, it preferably comprises a bis-tetrahydroindenyl (THI) compound.

Preferably the catalyst system comprises (a) a metallocene catalyst component comprising a bis-tetrahydroindenyl compound of the general formula $(IndH_4)_2R''MQ_2$ in which each $IndH_4$ is the same or different and is tetrahydroindenyl or substituted tetrahydroindenyl, R" is a bridge which comprises a $C_1$-$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen; and (b) a cocatalyst which activates the catalyst component. Each bis-tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_v$, in which X is chosen from group IVB, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted. In a particularly preferred embodiment, both indenyls are unsubstituted. R" is preferably an ethylene bridge which is substituted or unsubstituted. The metal M is preferably zirconium, hafnium or titanium, most preferably zirconium. Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl)zirconium dichloride is a particularly preferred bis-tetrahydroindenyl compound.

Silica supported chromium catalysts are typically subjected to an initial activation step in air at an elevated activation temperature. The activation temperature preferably ranges from 500 to 850° C., more preferably 600 to 750° C.

In the process of the invention, the first reactor of the series is supplied with catalyst and the cocatalyst in addition to the diluent and monomer, and each subsequent reactor is supplied with, at least, monomer, in particular ethylene and with the slurry arising from a preceding reactor of the series, this mixture comprising the catalyst, the cocatalyst and a mixture of the polymers produced in a preceding reactor of the series. It is optionally possible to supply a second reactor and/or, if appropriate, at least one of the following reactors with fresh catalyst and/or cocatalyst. However, it is preferable to introduce the catalyst and the cocatalyst exclusively into a first reactor.

The invention claimed is:

1. Process for producing a multimodal polyethylene in at least two loop reactors connected in series, in which 20-80 wt % of a high molecular weight (HMW) polymer is made in suspension in a first reactor and 20-80 wt % of a low molecular weight (LMW) polymer is made in suspension in a second reactor, one polymer being made in the presence of the other in either order, wherein the ratio of the average activity in the LMW reactor to the average activity in the HMW reactor is from 0.25 to 1.5, where average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)], residence time being defined as the mass of the polymer in the reactor (kg)/the output rate of polymer from the reactor (kg/hr), and the volumes of the two reactors differ by less than 10%.

2. Process according to claim 1, wherein the ratio of length to diameter of the first HMW reactor, L/D(1), is greater than that of the second LMW reactor, L/D(2).

3. Process according to claim 1, wherein the ratio of length to diameter of the first HMW reactor, L/D(1), is substantially equal to the ratio of length to diameter of the second LMW reactor, L/D(2).

4. Process according to claim 1, wherein a high molecular weight (HMW) polymer is made in suspension in the first reactor and a low molecular weight (LMW) polymer is made in suspension in the second reactor in the presence of the first polymer.

5. Process for producing a multimodal polyethylene in at least two loop reactors connected in series, in which 20-80 wt % of a high molecular weight (HMW) polymer is made in suspension in a first reactor and 20-80 wt % of a low molecular weight (LMW) polymer is subsequently made in suspension in a second reactor in the presence of the HMW polymer, wherein the ratio of the average activity in the LMW reactor to the average activity in the HMW reactor is from 0.25 and 1.5, where average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)], residence time being defined as the mass of the polymer in the reactor (kg)/the output rate of polymer from the reactor (kg/hr), and the volumes of the two reactors differ by less than 10%, and the ratio of length to diameter of the first HMW reactor, L/D(1), is substantially equal to the ratio of length to diameter of the second LMW reactor, L/D(2).

6. Process according to claim 4, wherein the catalyst employed to produce the multimodal polyethylene is a chromium catalyst.

7. Process according to claim 1, wherein the catalyst employed in the process is a Ziegler-Natta catalyst, the weight ratio of LMW to HMW polymer is from 40:60 to 60:40, and the space time yield (defined as production of polymer in kg/h per cubic metre of reactor) is at least 150 kg/m$^3$/h.

8. Process according to claim 1, in which the high molecular weight (HMW) polymer is made in the first reactor and the low molecular weight (LMW) polymer is subsequently made in suspension in the second reactor in the presence of the HMW polymer, wherein the ratio of ethylene concentration (in mol %) in the second reactor to that in the first reactor is 5 or less.

9. Process according to claim 1, in which the high molecular weight (HMW) polymer is made in the first reactor and the low molecular weight (LMW) polymer is subsequently made in suspension in the second reactor in the presence of the HMW polymer, wherein the concentration of ethylene in the second reactor is less than 8 mol %, based on the total liquids in the reactor.

10. Process according to claim 1, in which the high molecular weight (HMW) polymer is made in the first reactor and the low molecular weight (LMW) polymer is subsequently made in suspension in the second reactor in the presence of the HMW polymer, wherein the temperature of the first reactor is maintained between 60 and 80° C.

11. Process according to claim 1, in which the high molecular weight (HMW) polymer is made in the first reactor and the low molecular weight (LMW) polymer is subsequently made in suspension in the second reactor in the presence of the HMW polymer, wherein the ratio of solids concentration in the first reactor to that in the second reactor is maintained at less than 1.0.

12. Process according to claim 1, wherein a slurry containing the multimodal polyethylene is transferred from the second of the two reactors to a flash tank operating at a pressure P and temperature such that at least 50 mol % of the liquid component of the slurry is withdrawn from the flash tank as a vapour.

13. Process according to claim 12, wherein the concentration in the second reactor of components having a molecular weight below 50 satisfies the equation $C_{lights} < 7 + 0.07(40 - T_c) + 4.4(P_c - 0.8) - 7(C_{H2}/C_{Et})$, where $C_{lights}$, $C_{H2}$, and $C_{Et}$ in this case are the concentrations of components having a molecular weight below 50, hydrogen and ethylene respectively in the second reactor, $T_c$ is the condensation temperature (° C.) of said vapour, and $P_c$ is the pressure (MPa g) at the location where the vapour withdrawn from the flash tank is condensed.

14. Process according to claim 1, wherein the reactors are liquid full.

15. Process according to claim 1, wherein the multimodal polyethylene is produced using a Ziegler-type catalyst, chromium catalyst or metallocene catalyst.

16. Process according to claim 2, wherein L/D(1) is at least 20% greater than L/D(2).

17. Process according to claim 7, wherein the space time yield at least 200 kg/m³/h.

18. Process according to claim 7, wherein the space time yield is at least 250 kg/m³/h.

19. Process according to claim 8, wherein the ratio of ethylene concentration (in mol %) in the second reactor to that in the first reactor is 3 or less.

20. Process according to claim 8, wherein the ratio of ethylene concentration (in mol %) in the second reactor to that in the first reactor is 2.5 or less.

21. Process according to claim 9, wherein the concentration of ethylene in the second reactor is between 1.5 mol % and less than 8 mol %, based on the total liquids in the reactor.

22. Process according to claim 10, wherein the temperature of the first reactor is less than 75° C.

23. Process according to claim 11, wherein the ratio of solids concentration in the first reactor to that in the second reactor is maintained at between 0.6 and 0.8.

24. Process according to claim 12, wherein at least 80 mol % of the liquid component of the slurry is withdrawn from the flash tank as a vapour.

25. Process according to claim 12, wherein 90 mol % of the liquid component of the slurry is withdrawn from the flash tank as a vapour.

26. Process according to claim 12, wherein 95 mol % of the liquid component of the slurry is withdrawn from the flash tank as a vapour.

* * * * *